United States Patent [19]

Ryan

[11] Patent Number: 4,505,337

[45] Date of Patent: Mar. 19, 1985

[54] PLOW JUMP MECHANISM

[75] Inventor: John W. Ryan, Botany, Australia

[73] Assignee: Agrowparts Pty Ltd., Botany, Australia

[21] Appl. No.: 439,061

[22] Filed: Nov. 5, 1982

[30] Foreign Application Priority Data

Nov. 10, 1981 [AU] Australia .............................. PF1497

[51] Int. Cl.³ .............................................. A01B 61/04
[52] U.S. Cl. .................................... 72/260.5; 172/710
[58] Field of Search .................... 172/260.5, 710, 264, 172/265, 266, 267, 705, 707, 708, 711, 706, 709

[56] References Cited

U.S. PATENT DOCUMENTS

| 642,510 | 1/1900 | Tuttle | 172/710 |
| 1,219,342 | 3/1917 | Myers | 172/264 |
| 3,321,027 | 5/1967 | Johnson | 172/264 |
| 3,536,141 | 10/1970 | Woelfel | 172/266 |
| 3,599,728 | 8/1971 | Moe | 172/264 |
| 4,068,723 | 1/1978 | Quanbeck | 172/267 |

FOREIGN PATENT DOCUMENTS

| 2389313 | 5/1977 | France | 172/705 |
| 45220 | 3/1917 | Sweden | 172/705 |
| 1591383 | 6/1981 | United Kingdom . | |

Primary Examiner—Richard J. Johnson
Attorney, Agent, or Firm—Ladas & Parry

[57] ABSTRACT

A jump mechanism for a plough having a frame and at least one digging shank, the jump mechanism includes a main draw bar pivotally coupling the shank to the frame so that the shank can pivot about each end of the bar and a movement control bar also pivotally coupling the shank to the frame so as to govern pivoting of the shank about one end of the main bar relative to the pivoting of the main bar relative to the shank.

5 Claims, 3 Drawing Figures

PLOW JUMP MECHANISM

The present invention relates to agricultural equipment and more particularly to tyned ploughs used to cultivate an earth layer.

It is a well known disadvantage of tyned ploughs that should an obstacle to encountered, it is not infrequent that the plough is damaged. This problem is exacerbated in the use of tyned ploughs, as described in Australian patent application Nos. 38716/78 and 38717/78, where a very shallow digging angle is employed. In such ploughs the digging point can become jammed which results in the point or tyne being damaged.

Attempts have been made to provide jump mechanisms whereby the tyne is moved to a position that the digging point will ride over the obstacle.

These known jump mechanisms have not been entirely successful particularly where shallow digging angles are employed.

It is an object of the present invention to overcome or substantially ameliorate the above disadvantages.

There is disclosed herein a jump mechanism for a plough having a frame to support at least one shank, said mechanism comprising a generally horizontal primary draw bar to be pivotally attached at one end to the frame so as to extend rearwardly therefrom and to be pivotally attached at the other end to said shank so that said shank can move relative to said frame by pivoting about two spaced transverse horizontal axis one at each end of said bar, pivot control means to regulate pivoting of said shank about said other end of said bar relative to the pivoting of said bar at said one end, and force applying means for attachment to said shank to biase said shank to a predetermined digging position.

A preferred form of the present invention will now be described by way of example with reference to the accompanying drawings wherein.

Figure 1:
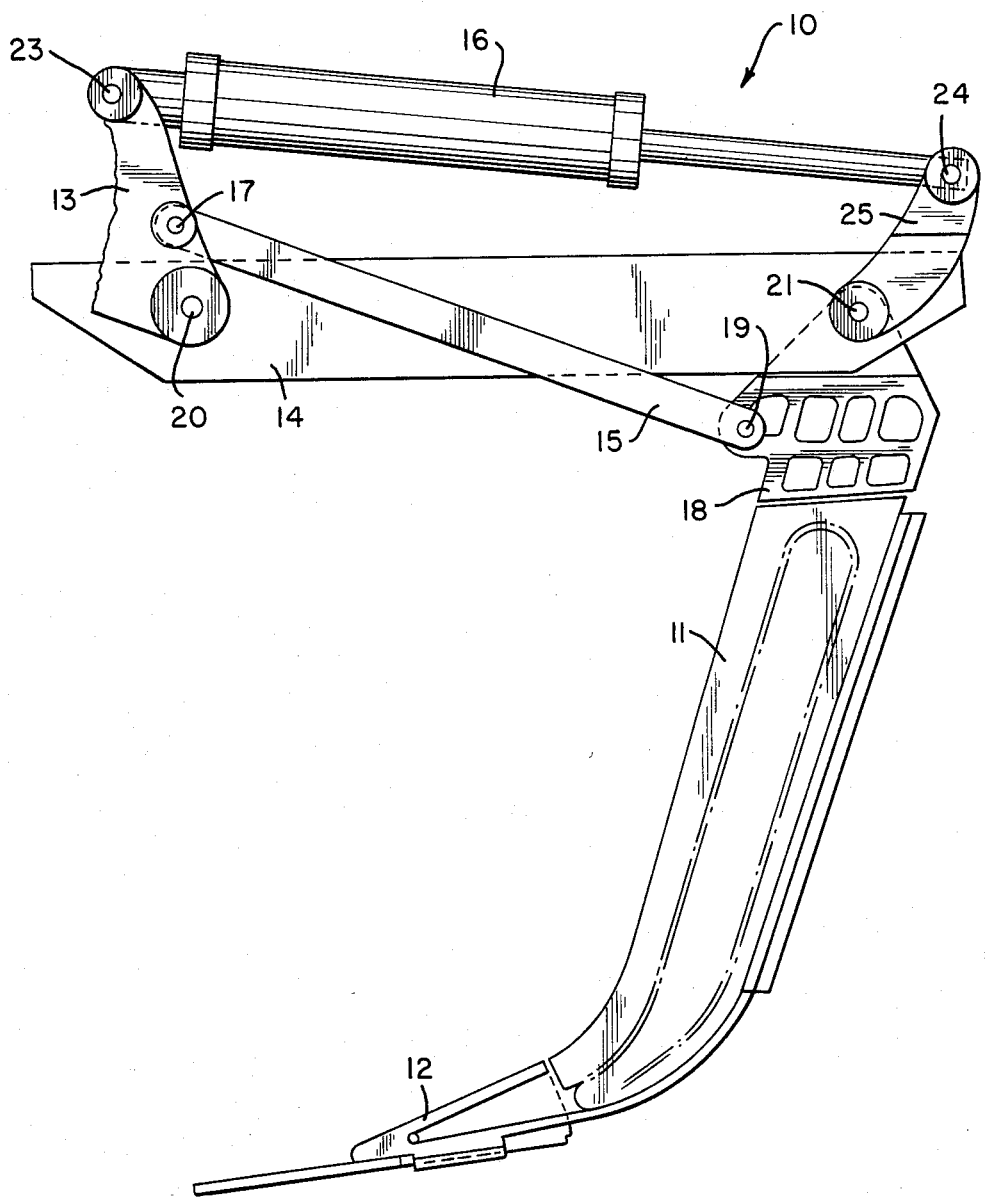
FIG. 1 is a side elevation schematically depicting a jump mechanism for the digging tyne of a plough.
Figure 2:
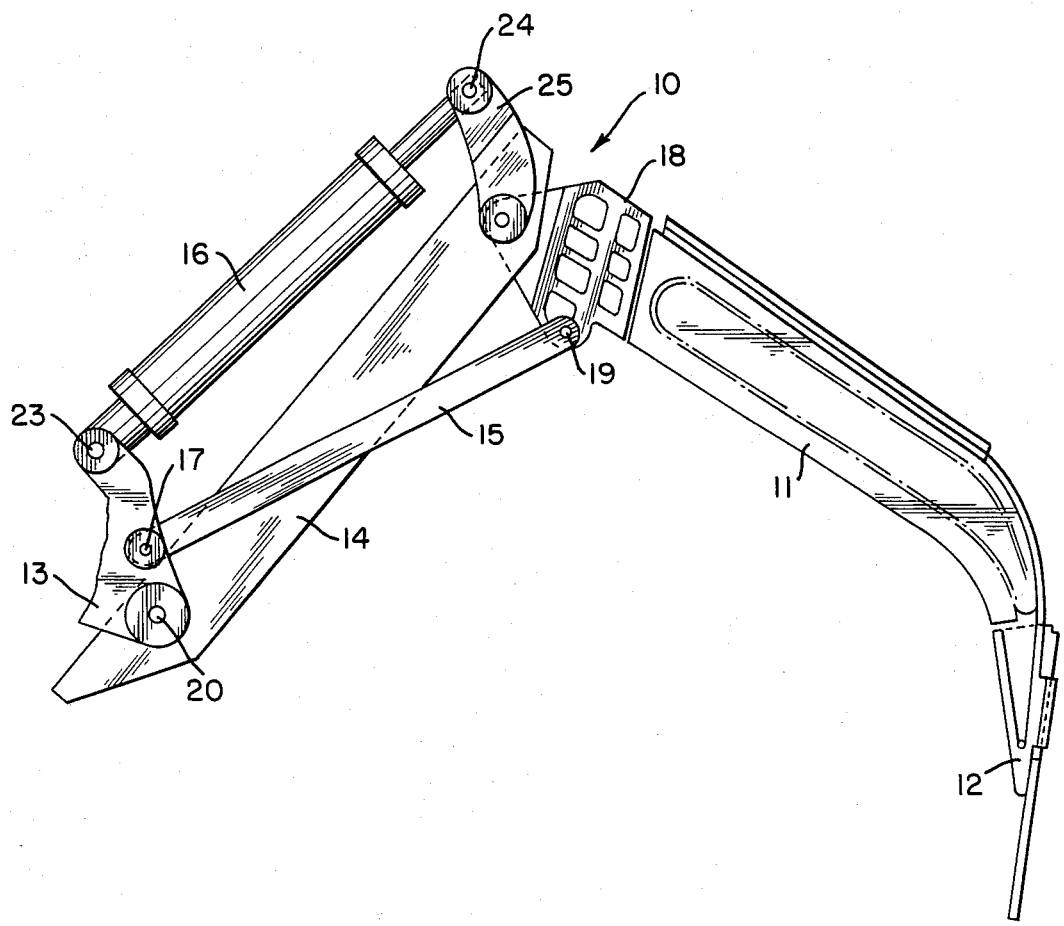
FIG. 2 is a side elevation schematically depicting the mechanism of FIG. 1 in a jump position.
Figure 3:
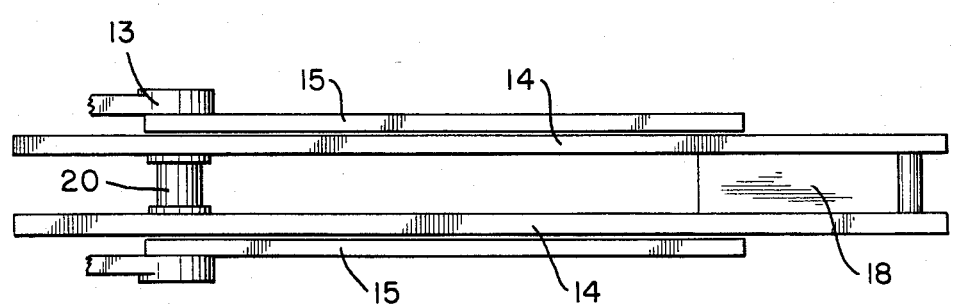
FIG. 3 is a schematic plan view of the mechanism of FIG. 1.

In the attached drawing there is illustrated a jump mechanism 10 for a plough having a frame 13 and at least one shank 11 which receives a digging point 12. The jump mechanism enables pivoting movement of the shank 11 relative to the frame 13 about two horizontal transverse axis one of which is defined by a pin 20 and the other of which is defined by the pin 21.

The jump mechanism 10 includes a main draw bar 14 which transfers the main towing force from the frame 13 to the shank 11 via the pins 20 and 21 which pivotally attach the bar 14 to the frame 13 and shank 11. The pin 21 engages a shank carrier 18 to which is fixed the shank 11. Extending from the frame 13 to a force transfer member 25 is a hydraulic ram 16, via pins 23 and 24, which biases the shank 11 to the digging position depicted in FIG. 1. The force transfer member 25 abuts the bar 14 and is pivotally attached to the ram 16 and carrier 18. The actual position of the shank 11 as seen in FIG. 1 is defined by firstly an abutment on the frame 13 which prevents clockwise movement of the bar 14 beyond the position depicted in FIG. 1, and secondly by an abutment on the carrier 18 which engages the bar 14 again to prevent clockwise movement of the shank 11 beyond the position depicted. A link 15 is provided as a control means of governing pivoting of the shank 11 about the pin 21 relative to the pivoting of the bar 14 about the pin 20.

The link 15 is pivotally coupled to the frame 13 by a pin 17 and is pivotally coupled to the shank carrier 18 by a pin 19. The pin 17 is positioned generally above the pin 20 while the pin 21 is positioned generally above the pin 19. However it should be appreciated that the relative positions of the pins 17 and 20 and 21 and 19 could be reversed. Also the pin 23 is positioned above the pin 20 as well as slightly forward thereof. As an alternative the ram 16 could be replaced by a spring.

In operation of the above mechanism 10 upon the digging point 12 encountering an obstacle, the shank is caused to pivot rearwardly. This results in two actions taking place, that is, the shank pivots about the pin 21 while simultaneously pivoting about the pin 20 at a rate controlled by the relative positions of the bar 14 and link 15. These two actions enable the shank to move rearward and upward to thereby overcome the obstacle. The upward movement of the shank 11 is provided mainly by movement about the pin 21 while the rearward movement is provided mainly by movement about the pin 21.

Upon the obstacle being overcome the shank again enters the soil as it is biased to the digging position by the ram 16.

The relative positions of the pins 23 and 20 partly determines the clockwise torque applied to the bar 14 about the pin 20. This torque in turn applies a force to the shank 11 biasing the shank 11 back into the soil. In order for this biasing force to be of sufficient magnitude, the line of action of the ram 16 preferably has a normal distance from the pin 20 which is at least equal to the same normal distance in a digging mode of operation.

To further aid the point 12 in clearing the obstacle, the point 12 is located at least partly forward of the pin 20. This location of the point 12 causes the point to move slightly downward so it pivots rearward upon encountering an obstacle. Additionally the bar 14 and link 15 are manufactured of spring steel to allow flexing thereof. This again aids the point in overcoming the obstacle.

As an alternative a toggle mechanism could couple the ram 16 to the carrier 18 to thereby govern movement of the shank about the pin 21, as an alternative to use of the bar 15.

The claims defining the invention are as follows.

I claim:

1. A jump mechanism for a plough having a frame to support at least one shank, said mechanism comprising a generally horizontal main draw bar to be pivotally attached at one end to the frame so as to extend rearwardly therefrom and to be pivotally attached at the other end to said shank so that said shank can move relative to said frame by pivotting about two spaced transverse horizontal axes one at each end of said bar, pivot control means to regulate pivoting of said shank about said other end of said bar relative to the pivotting of said bar at said one end, force supplying means for attachment to said frame and jump mechanism to bias said shank to a predetermined digging position, and wherein said pivot control means is a control bar extending rearwardly downwardly from a forward position above said one end to a rearward position below said other end, said control bar being pivotally attached to said frame at said forward position and pivotally attached to said shank at said rear position.

2. The mechanism of claim 1 wherein said control bar is pivotally attached to said frame adjacently above said one end of said main bar and is pivotally attached to said shank adjacently below said other end of said main bar.

3. The mechanism of claim 2 wherein said shank is fixed at its upper end to a shank carrier and said main bar and control bar are pivotally attached to said carrier.

4. The mechanism of claim 3 wherein said force applying means is a hydraulic ram.

5. The mechanism of claim 4 wherein said force means is attached to said other end of said main bar and to said frame.

* * * * *